United States Patent [19]

Bergthaller et al.

[11] Patent Number: 4,767,698
[45] Date of Patent: Aug. 30, 1988

[54] PHOTOGRAPHIC MATERIAL CONTAINING A PYRIDINE AZO OR PYRIDAZINE AZO CYAN DYE RELEASING COMPOUND

[75] Inventors: Peter Bergthaller, Bergisch Gladbach; Rudolf Stolzenburg, Langenfeld; Paul Marx, Leverkusen, all of Fed. Rep. of Germany

[73] Assignee: Agfa-Gevaert Aktiengesellschaft, Leverkusen, Fed. Rep. of Germany

[21] Appl. No.: 37,732

[22] Filed: Apr. 13, 1987

[30] Foreign Application Priority Data

Apr. 23, 1986 [DE] Fed. Rep. of Germany ....... 3613621

[51] Int. Cl.$^4$ .......................... G03C 5/54; G03C 7/26
[52] U.S. Cl. ...................................... 430/562; 430/223
[58] Field of Search ............... 430/223, 225, 562, 222, 430/226

[56] References Cited

U.S. PATENT DOCUMENTS 3,998,640 12/1976 Ciurca et al. ........................ 430/223
4,529,692 7/1985 Ono et al. ............................ 430/223

Primary Examiner—Richard L. Schilling
Attorney, Agent, or Firm—Connolly & Hutz

[57] ABSTRACT

Cyan partial color images with increased light fastness and improved stability to moisture and heat may be produced by the dye diffusion process using cyan dyes corresponding to formula I released from dye releasing compounds.

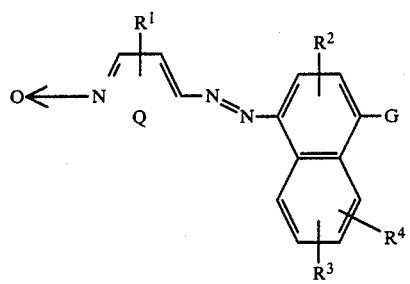

In the above formula,
Q denotes a group for completing a pyridine or pyridazine ring optionally carrying a condensed aromatic ring;
G denotes OH or NH—SO$_2$—R$^5$;
R$^1$ denotes H or one, two or three substituents;
R$^2$ denotes H or a group with electron acceptor character preferably situated in an ortho-position to G;
R$^3$ denotes H, acylamino or a group such as G;
R$^4$ denotes H, SO$_2$—NR$^6$—R$^7$ or NH—SO$_2$—R$^5$;
R$^5$ denotes alkyl, aralkyl, aryl or NR$^6$—R$^7$;
R$^6$, R$^7$ denote H, alkyl or aralkyl or together form a group for completing a cyclic amino group.

3 Claims, No Drawings

PHOTOGRAPHIC MATERIAL CONTAINING A PYRIDINE AZO OR PYRIDAZINE AZO CYAN DYE RELEASING COMPOUND

This invention relates to a colour photographic recording material for the production of colour images by the dye diffusion transfer process, containing a non-diffusible colour providing compound associated with at least one light-sensitive silver halide emulsion layer, from which compound a diffusible cyan dye is released in the process of development.

The dye diffusion transfer process is based on the production of an imagewise distribution of diffusible dyes in the course of development in a light-sensitive element in accordance with a preceding exposure and the transfer of this distribution of dyes to an image receptor element.

It is very important for this process that the dyes should be sufficiently fixed in the image receptor layer and they should also have excellent spectral properties and excellent stability to light and heat.

Cyan dyes for the dye diffusion process containing a phthalocyanine group as chromophore, preferably in the form of the copper complex, have been disclosed, e.g. in DE-A-No. 3 101 036.

One disadvantage of these basically extremely stable dyes is their insufficient capacity for diffusion compared with the yellow and magenta dyes normally used. As a result, the transfer of colour is accompanied by a progressive shift from red to neutral and the optimum transfer time must be strictly observed.

Dyes of the 4-(4-nitrophenylazo)-1-naphthol series have been described as rapidly diffusing cyan dyes for the dye diffusion process, e.g. in DE-A-No. 24 06 653 and DE-A-No. 28 53 584.

The dyes mentioned in DE-A-No. 24 06 653 are present in the form of an anionic chromophore after separation of the carrier group which confers diffusion resistance, and in this form they diffuse into the image receptor layer and are fixed on the mordant in the form of the dye anion. Anionic dyes generally have little fastness to light and it is therefore not surprising that the cyan anionic dyes from the 4-(4-nitrophenylazo)-naphthol series are insufficiently lightfast. With a view to overcoming this disadvantage, dyes from this class in which the lightfastness is improved by an additional carbamoyl substitution in the ortho-position to the OH group have been disclosed in DE-A-No. 28 53 584.

An improvement in lightfastness as well as in the general resistance to heat and moisture, especially inside a sealed combination of layers, a so-called monopack, is achieved by using monoazo dyes from the series of nitrophenylazonaphthosultams, which have been described in DE-A-No. 2 806 196 as cyan dyes for the dye diffusion process.

Common to all these dyes is that the presence of a nitro group in the para-position to the azo group renders the chromophore liable to attack by reducing agents.

Virtually all recording materials for the dye diffusion transfer process, however, contain reducing agents for certain functions, quite apart from the developer substances. The intermediate layers between the individual layer packets associated with the different partial colours, for example, normally contain reducing agents, in particular from the series of monoalkylated or dialkylated hydroquinones. These are capable of absorbing developer oxidation products and are therefore highly reactive.

Furthermore, recording materials which contain reducible dye releasing compounds contain so-called electron donor compounds (ED compounds), or their precursors in association with these dye releasing compounds. Information on this subject is given in the following Applications: EP-A- No. 0004 399, U.S. Pat. Nos. 4 139 379, 4 278 750, DE-A-No. 30 14 669, EP-A-No. 0 038 092, DE-A-No. 30 08 588 and DE-A-No. 30 06 268.

It is known that 4-nitrophenylazo dyes are more readily attacked by reducing agents than other monoazo dyes. Even the brief contact between reducing agent and chromophore during the time of formation of the image may be sufficient in the presence of a strongly alkaline processing medium to change the cyan dye to compounds of unknown structure which absorb light of shorter wavelengths so that the colour changes from cyan to blue or even violet.

It is therefore desirable for the purpose of the dye diffusion process to provide readily diffusible can monoazo dyes which contain no 4-nitrophenylazo group and are therefore less sensitive to reduction.

It is an object of the present invention to provide new colour providing compounds for the dye diffusion transfer process, which in the process of photographic development release diffusible cyan dyes which have improved lightfastness. improved spectral properties and improved resistance to reducing agents.

The present invention relates to a colour photographic recording material for the production of colour images by the dye diffusion transfer process, containing, associated with at least one light-sensitive silver halide emulsion layer, a non-diffusible colour providing compound (dye releasing compound) from which a diffusible azo dye is released under the conditions of alkaline development as a function of the development of the silver halide emulsion layer, characterised in that the azo dye corresponds to the following formula I

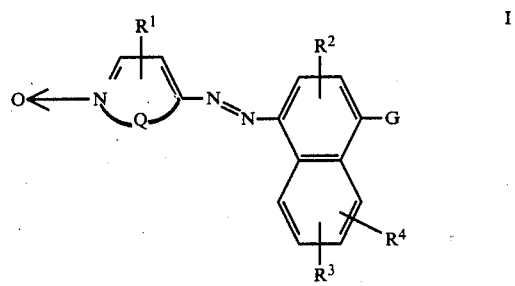

wherein
  Q denotes a group for completing a pyridine or pyridazine ring on which a carbocyclic or heterocyclic aromatic ring may be condensed;
  G denotes OH or $NH-SO_2-R^5$;
  $R^1$ denotes H or one, two or three substituents selected from halogen, alkyl, aryl, carboxyl, alkoxycarbonyl. carbamoyl, cyan, alkoxy, alkylthio, alkylsulphonyl, arylthio and arylsulphonyl:
  $R^2$ denotes H or a group with an electron acceptor character preferably situated in an ortho-position to G, preferably $SO_2-NR^6-R^7$, $CO-NR^6-R^7$ or Cl;
  $R^3$ denotes H, acylamino or a group G' conforming to the same definition as G;
  $R^4$ denotes H, $SO_2-NR^6-R^7$ or $NH-SO_2-R^5$;

$R^5$ denotes alkyl, aralkyl, aryl or $NR^6$-$R^7$;

$R^6$ denotes H, alkyl, aralkyl or a group which together with $R^7$ and the N atom forms the residue of a cyclic amino group;

$R^7$ denotes H, alkyl, aralkyl, aryl or a group which together with $R^6$ and the N atoms forms the residue of a cyclic amino group.

Both the group G and the group G′ denoted by $R^3$ may be present in the anionic form under the conditions of alkaline development. The group G may initially be present in the acylated form, e.g. as O-acyl group, which is then hydrolysed under the conditions of alkaline development.

Two groups $R^5$, $R^6$ and $R^7$ occurring in the same compound need not necessarily be identical.

A condensed carbocyclic aromatic ring contained in the group Q may be, for example, a condensed benzene ring, and a condensed heterocyclic aromatic ring may be, for example, a condensed pyrrole, pyridine or thiophene ring. The condensed rings may be further substituted, e.g. by halogen, alkyl, aryl, alkoxy, cyano, sulphamoyl or acylamino.

The alkyl groups mentioned in the definitions of $R^1$ and $R^5$ to $R^7$ preferably do not contain more than 4 carbon atoms. Preferred examples are methyl, ethyl, n-propyl, isopropyl, n-butyl and t-butyl.

Benzyl and phenylethyl are examples of aralkyl groups.

The aforesaid aryl groups are preferably phenyl groups or naphthyl groups and they may be further substituted, e.g. by alkyl, alkoxy, acylamino, sulphamoyl or sulphinate but they preferably do not contain more than 17 carbon atoms, including those present in such substituents.

The cyclic amino groups mentioned in the definition of $R^6$ and $R^7$ are 5- to 7-membered cyclic amino groups, e.g. the pyrrolidine, piperidine or morpholine group.

In the present case, the acyl groups (acylamino) are derived from aliphatic or aromatic carboxylic acids, carbamic acids or carbonic acid semiesters.

In addition, the dyes corresponding to formula I contain suitable functional groups for adjusting the diffusion and mordanting properties, e.g. in the form of G or in the form of one or more of the groups already mentioned under $R^1$ to $R^7$ or in the form of substituents optionally attached to one of these groups through a suitable connecting member. Examples of these functional groups include anionic and anionizable groups such as sulphonate, sulphinate, phenolate, naphtholate, carboxylate, disulphimide or sulphamoyl groups and functional groups resulting from the splitting of a bond on a carrier group containing a ballast group. Such a functional group is characteristic of the nature of the carrier group and of the link. The last-mentioned functional groups may be identical with one of the above-mentioned groups which modify the diffusion and mordanting characteristics. Such a functional group may be attached, for example, to an alkyl or aryl group which in turn may be a constituent of one of the groups mentioned under $R^1$ to $R^7$.

Advantageous results are obtained particularly if the azo dye released corresponds to the following formula II

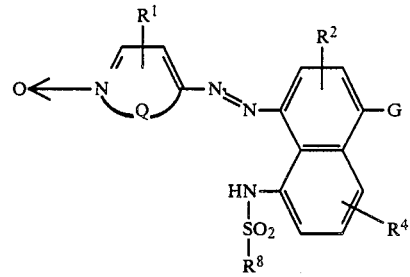

wherein Q, G, $R^1$, $R^2$ and $R^4$ have the meanings indicated above and $R^8$ denotes alkyl, aryl or $NR^6$-$R^7$.

Formulae I and II apply to the diffusible dyes according to the invention which may be released in the course of development. These are released, for example, a dye corresponding non-diffusible colour-providing compounds dye releasing compounds) incorporated in the photographic layer. These are compounds in which, for example, from residue corresponding to formula I is attached to a carrier group CAR containing at least one ballast group, optionally with interposition of a suitable connecting member.

The connection of the dye of formula I to the carrier group may take place, for example, through one of the substituents $R^1$, $R^2$, $R^3$, $R^4$ or G. The dye releasing compounds according to the invention may therefore be represented by the following formula III

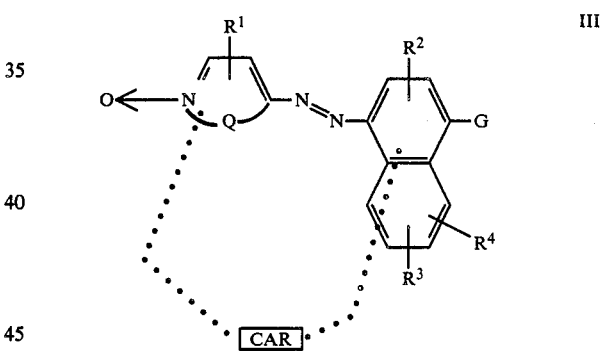

wherein $R^1$-$R^4$, G and Q have the meanings already indicated, CAR denotes a carrier group containing at least one group conferring diffusion resistance, and the broken lines denote possible linkage points. The carrier group is thus present as substituent in one of the above-mentioned groups in the dye releasing compounds according to the invention corresponding to formula III.

The carrier group denoted by CAR contains, in addition to a ballast group, at least one group which can be split off as a result of the development of a silver halide emulsion layer so that the dye attached to the carrier group is separated from the ballast group, possibly together with a small fragment of the original carrier group, and can thus be released from its attachment to the layer. The carrier groups may vary in structure according to the mode of functioning of the releasable group.

The dye releasing compounds according to the invention may be any of a wide variety of types of compounds which are all distinguished by a connecting member which connects a dye residue to a carrier group containing a ballast group and which is redox dependent in the strength of its attachment.

A summarizing account of this field is given in Angew. Chem. Int. Ed. Engl. 22 (1983) 191-209, in which the most important of the known systems are described.

Particularly advantageous redox active dye releasing compounds are those corresponding to the formula

BALLAST - REDOX - DYE wherein

BALLAST denotes a ballast group,

REDOX denotes a redox active group, i.e. a group which can be oxidized or reduced under the conditions of alkaline development and which is subject to varying degrees, depending on whether it is in the oxidized or reduced state, to an elimination reaction, a nucleophilic displacement reaction, hydrolysis or other splitting reactions resulting in separation of the residue DYE, and DYE denotes the residue of a diffusible dye. in the present case a dye corresponding to formula I.

The ballast groups may be regarded as groups which enable the dye releasing compounds according to the invention to be incorporated in a diffusion-fast form in the hydrophilic colloids normally used in photographic materials. These groups are preferably organic groups, generally straight chained or branched aliphatic groups having generally 8 to 20 carbon atoms and optionally also containing carbocyclic or heterocyclic, optionally aromatic groups. These groups are attached to the remainder of the molecule either directly or indirectly. e.g. through one of the following groups: NHCO. NHSO2, NR (R denotes hydrogen or alkyl). O or S.

The ballast group may in addition contain groups which confer solubility in water, e.g. sulpho groups or carboxyl groups, and these may also be present in an anionic form. Since the diffusion properties depend on the molecular size of the whole compound, it is sufficient in certain cases to use relatively short chained groups as ballast groups, e.g. if the molecule as a whole is large enough.

Redox active carrier groups having the structure BALLAST-REDOX-dye releasing compound are known in various forms. A detailed description need not be given here but reference may be made to above mentioned summary in Angew. Chem. Int. Ed. Engl. 22 (1983) 191-209.

Some examples of redox active carrier groups from which a dye residue is released as a result of previous imagewise oxidation or reduction are given below purely for the sake of illustration.

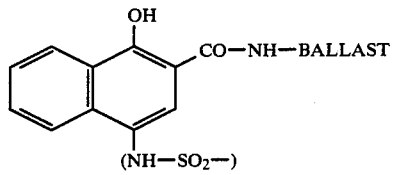

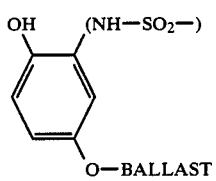

-continued

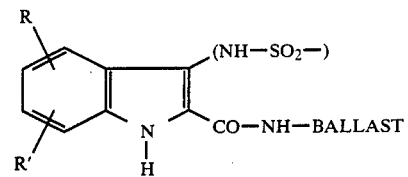

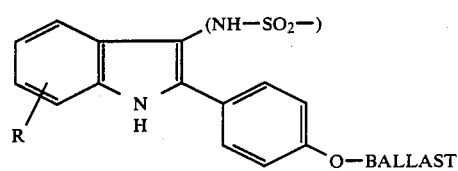

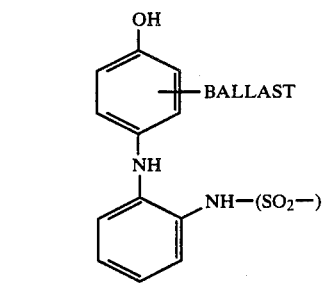

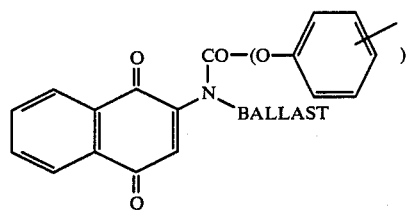

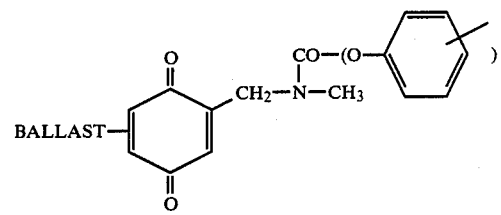

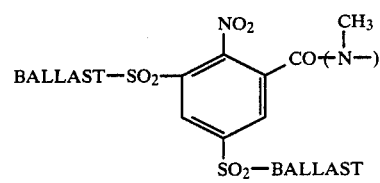

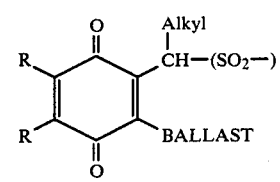

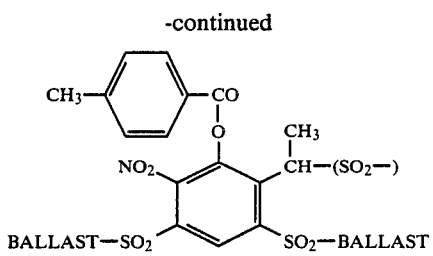

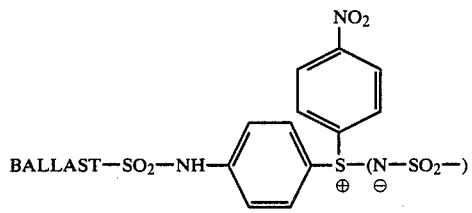

The groups in brackets are functional groups of the dye residue and are separated together with this residue from the remaining part of the carrier group. The functional group may be a substituent which has already been mentioned in the definition of the groups $R^1$ to $R^8$ in formulae I, II and III and which may exert a direct influence on the absorption properties of the released dye. On the other hand, the functional group may be separated from the chromophore of the dye by an intermediate member or linking member by being present as substituent on one of the groups denoted by $R^1$ to $R^8$; the absorption properties are not necessarily affected thereby. Lastly, the functional group may have some importance together with the intermediate member in influencing the diffusion, mordanting and stability properties of the released dye. Suitable intermediate members are found among the alkylene and arylene groups.

The following are examples of publications in which suitable dye releasing compounds are described: U.S. Pat. Nos. 3 227 550, 3 443 939, 3 443 940, DE-A-No. 1 930 215, DE-A-No. 2 242 762, DE-A-No. 2 402 900, DE-A-No. 2 406 664, DE-A-No. 2 505 248, DE-A-No. 2 543 902, DE-A No. 2 613 005, DE-A-No. 2 645 656, DE-A-No. 2 809 716, DE-A-No. 2 823 159, BE-A-No. 861 241, EP-A-No. 0 004 399, EP-A-No. 0 004 400, DE-A-No. 3 008 588, DE-A-No. 3 014 669 and GB-A-No. 8 012 242.

In some embodiments of the recording material according to the invention, the dye releasing compounds may be present in an oxidizable form or capable of coupling whereas in others it may be present as reducible compound. When conventional negative silver halide emulsions are used, the copy obtained from the original is a negative or positive according to whether the dye is released from the oxidized or the reduced form of dye releasing compound. Either positive or negative images may therefore be obtained as desired by suitable choice of the dye releasing systems.

For producing positive colour images from positive originals when negatively functioning silver halide emulsions are used it is suitable, for example, to use a recording material according to the invention wherein the reducible dye releasing compounds contain a carrier moiety corresponding to the following formula:

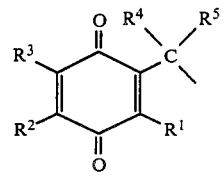 "Carquin"

wherein
$R^1$ denotes alkyl or aryl;
$R^2$ denotes alkyl, aryl or a group which together with $R^3$ completes a condensed ring;
$R^3$ denotes hydrogen, alkyl, aryl, hydroxyl, halogen such as chlorine or bromine, amino, alkylamino or dialkylamino, including cyclic amino groups (such as piperidino, morpholino), acylamino, alkylthio, alkoxy, aroxy, sulpho or a group which together with $R^2$ completes a condensed ring;
$R^4$ denotes alkyl;
$R^5$ denotes alkyl or, preferably, hydrogen, and at least one of the groups $R^1$ to $R^4$ contains a ballast group.

The monoazo dyes of formula I used according to this invention are new. At pH values below 5 to 6 and in the unmordanted form, some of them are not present in the cyan anionic form but in the violet to blue neutral form.

This is precisely what is desired in photographic recording materials used for the dye diffusion process since it ensures that in its fixed form the dye has no pronounced capacity for absorption in the region of the sensitivity to which an associated emulsion layer is sensitized and therefore does not have a pronounced unwanted filtering action.

An additional reduction in the filtering effect of the non-diffusibly incorporated dye may be achieved in particular by blocking the auxochromic group G by an acyl function which is readily split off, e.g. by means of one of the protective groups described in EP-A-No. 0 009 989 which can be split off by a ring closure mechanism.

Preparation of the monoazo dyes according to the invention corresponding to formula I or of the dye releasing compounds corresponding to formula III is normally carried out by a plurality of steps, one of which forms the linkage with the carrier group which confers diffusion resistance while another is concerned with synthesis of the chromophore. The latter is normally carried out by azo coupling of the diazonium salt from a corresponding 4-aminopyridine-N-oxide, 4-aminopyridazine-N-oxide, 4-aminoquinoline-N-oxide or 4-aminothienopyridine-N-oxide corresponding to formula IV with a naphthol, naphthosultam or sulphonamidonaphthalene corresponding to formula V.

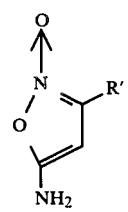 IV

-continued

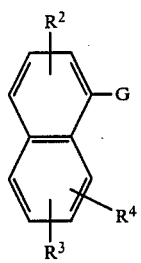

V

In formulae IV and V, Q, $R^1$ to $R^4$ and G have the meanings already indicated. Individual substituents may be present in a functionally modified form, i.e. a form from which they can be converted into their final form by known methods of preparation. Thus, for example, a group which is ultimately to be present as a sulphonamide or sulptinic acid function may initially be present in the form of the corresponding sulphochloride or sulphofluoride.

The process is well known and has been described and requires no further explanation for the man of the art. Suitable methods of diazotization and azo coupling have been described in various publications. Instructions for the synthesis of special 4-aminoazine-N-oxides, for example, may be found in the following monographs: "Quinoline-N-oxides" Volume 32, Part II of the series "The Chemistry of Heterocyclic Compounds", John Wiley and Sons 1982, pages 377–605. "Chemistry of Heterocyclic N-oxides" by Katritzky and Logowski, Volume 19 of the series "Organic Chemistry, A series of monographs", Academic Press 1971, and Ochiai, "Aromatic Amine Oxides" Elsevier 1967.

Other methods may also be used for the preparation of the dyes, e.g. the reaction of a substituted 1,4-naphthoquinone with a corresponding 4-hydrazinoazine-N-oxide, e.g. a 4-hydrazinopyridine-N-oxide. 4-hydrazinopyrazine1-oxide or 4-hydrazinoquinoline-N-oxide or the oxidative coupling of hydrazine with naphthol. The hydrazine may in this case be present in the form of a sulphonyl hydrazine.

Lastly, it should be mentioned that instead of using 4-aminoazine-N-oxides, the corresponding 4-hydroxylaminoazine-N-oxides may advantageously be used for diazotization. These may be obtained from the corresponding nitro compounds as a preliminary stage of the amino-N-oxides in the process of hydrogenation and are sometimes easier to obtain than the amino compounds. For an account of this subject see pages 71–72 "Methoden der organischen Chemie", Houben-Weyl, Volume X/3, Georg Thieme Verlag/1965

An advantageous method of oxidative coupling of hetarylhydrazines with compounds capable of coupling, e.g. 1-naphthols, is described in German Patent Application P No. 35 17 273.8. These hydrazines are distinguished by the fact that they are readily obtainable from the corresponding 4-halogenazine-N-oxides by nucleophilic exchange with hydrazine.

An overview of examples of suitable 4-aminoazine-N-oxides (diazo components; "amine") is given below.

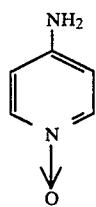 Amine 1

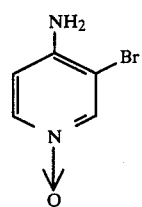 Amine 2

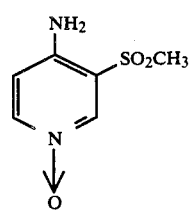 Amine 3

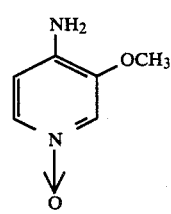 Amine 4

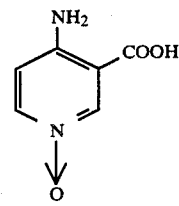 Amine 5

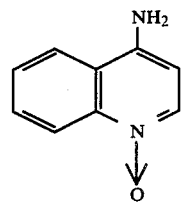 Amine 6

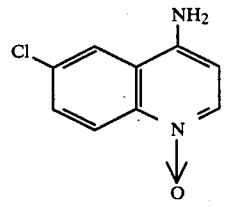 Amine 7

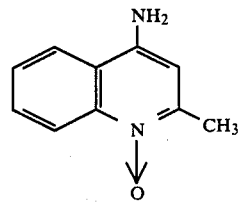 Amine 8

Amine 9
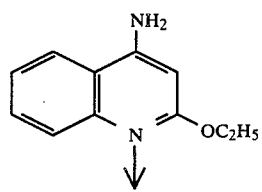

Amine 10
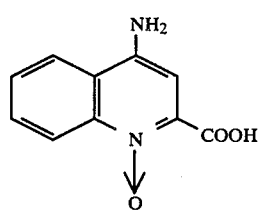

Amine 11
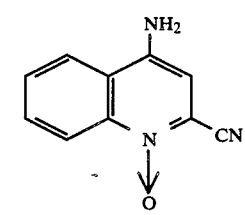

Amine 12
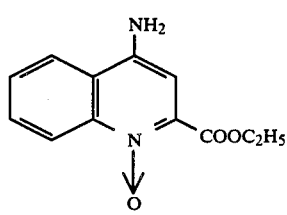

Amine 13
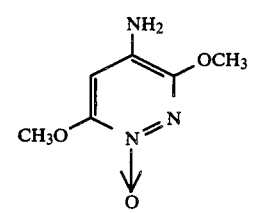

Amine 14
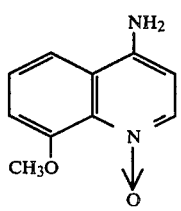

Amine 15
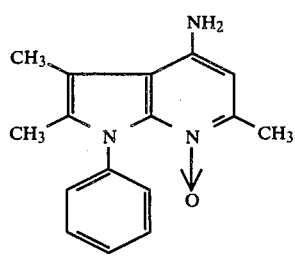

Amine 16
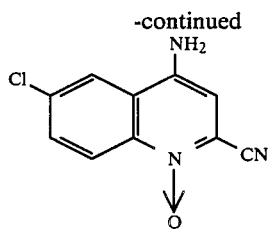

Amine 17
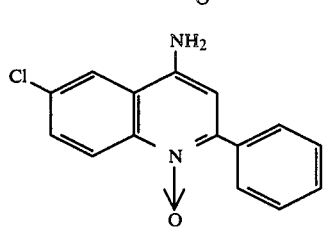

Amine 18
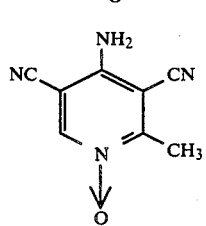

The dyes of formula I are based on coupling components known from the chemistry of 1-naphthols and 1-naphthylamines. These can be converted into the coupling components proper by suitable reactions, e.g. by way of sulphochlorides or carboxylic acid chlorides or by halogenating and/or Bucherer reactions.

5-Sulphonamido-1-naphthols are particularly suitable coupling components. These may contain further substituents, e.g. sulphamoyl or carbamoyl groups, in particular in the 2,6 or 8 positions of the naphthol nucleus.

Sulpho groups may be converted into a sulphochloride in the course of the synthesis and may undergo further reaction to form sulphonamides. The finished dyes, however, are sensitive to halogenating agents such as phosphoric acid halides or acid chlorides, e.g. phosgene or oxalyl chloride, and formation of all the sulphonamide functions in the dye should therefore preferably be carried out before the coupling reaction.

The following compounds are examples of naphthols suitable as components for the synthesis of the corresponding dyes:

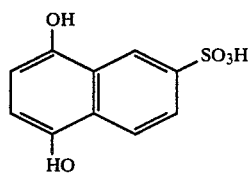

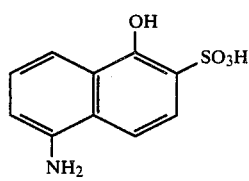

Groups or intermediate links provided for connection with the carrier group which confers diffusion resistance are generally introduced by way of the suphochlorides.

These reactions are known and require no detailed description here.

An exemplary survey of dye releasing compounds according to the invention corresponding to the general formula III is given below.

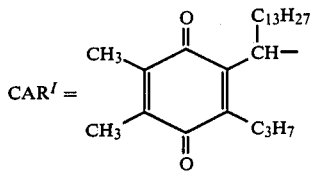

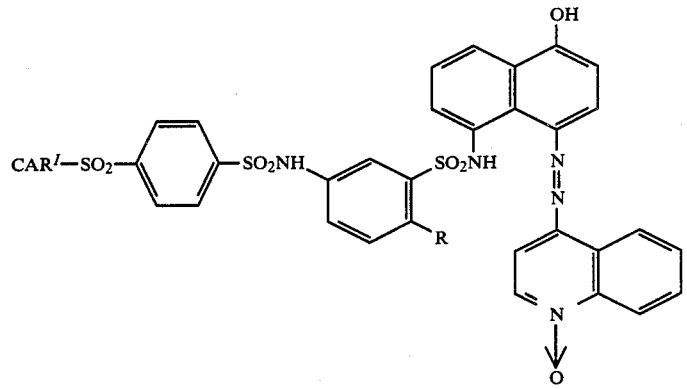

Dye releasing compound 1  R = OCH$_3$
Dye releasing compound 2  R = NHSO$_2$CH$_3$
Dye releasing compound 3  R = O—CH$_2$—CH$_2$OCH$_3$ Dye releasing compound 4

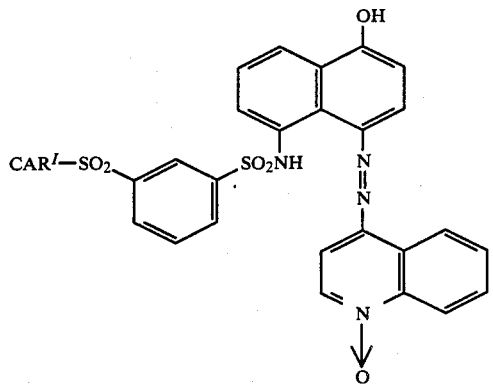

Dye releasing compound 5

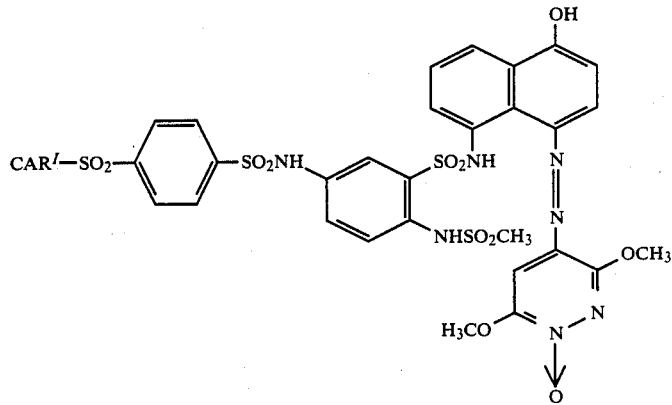

Dye releasing compound 6

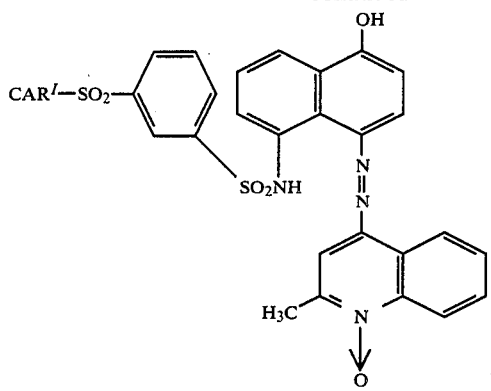

The synthesis of some amines used as intermediate products and of dye releasing compound 4 is described below to illustrate the method of preparation.

(a) 4-Nitro-3-methyl-thiopyridine-N-oxide

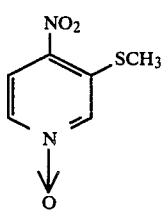

A solution of 8 g of sodium bicarbonate in 50 ml of water and a mixture of 10 g of 4-nitro-3-fluoropyridine-N-oxide (prepared by the method of Talik and Talik, Roczniki Chem. 38 [1964], 77) in 50 ml of ethanol are simultaneously introduced with vigorous stirring into 50 ml of a 20% solution of CH3SH in ethanol. A precipitate forms from the resulting solution. The precipitate is separated by suction filtration after 30 minutes and then washed with ethanol.

Yield: 9.7 g (93% of theoretical) m.p. °C.

(b) 3-Methylsulphonyl-4-nitropyridine-N-oxide

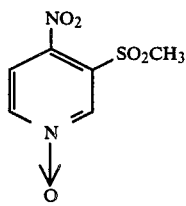

10 g of 3-Methylthio-4-nitropyridine-N-oxide (a) are dissolved in 100 ml of glacial acetic acid and 50 ml of hydrogen peroxide (30%) with mild heating. 0.5 g of tungstic acid in dilute NaOH are then added dropwise with cooling. The reaction mixture is then stirred for 30 minutes at 60° C. and excess peracetic acid is distilled off under vacuum. 50 ml of water are added three times. The temperature should not rise above 40° C. The residue is stirred up with water, suction filtered and dried on clay.

Yield: 6.7 g (57% of theoretical).

The yellow product decomposes after sintering at temperatures from 180° C.

(c) 3-Methyl-4-aminopyridine-N oxide (Amine 3)

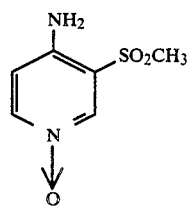

1 g of 3-Methylsulphonyl-4-nitropyridine-N-oxide (b) is dissolved in 50 ml of water and hydrogenated at 20–25° C. with hydrogen under a pressure of 1.5 bar using 0.5 g of 10% palladium charcoal as catalyst. When all the hydrogen has been taken up, the catalyst is removed by suction filtration and the mother liquor is concentrated by evaporation.

(d) 4-Amino-3-methoxy-pyridine-N-oxide (Amine 4)

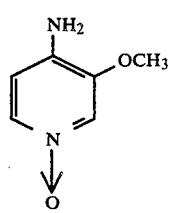

1 g of 4-nitro-3-methoxypyridine-N-oxide (prepared according to H. J. DenHertog, Recueil. Trav. Chim. Pays bas 74, 1160 (1955) or by the reaction of 3-fluoro-4-nitropyridine-N-oxide with sodium methylate solution) is hydrogenated in 50 ml of ethanol at 20 to 25° C. under a hydrogen pressure of 2 bar using 0.5 g of 10% palladium charcoal as catalyst. When all the hydrogen has been taken up, the catalyst is removed by suction filtration and the mother liquor is concentrated by evaporation. The substance is then chromatographed on silica gel at 63–200 μm with a mixture of methylene chloride methane 95:5.

Yield: 0.23 g of 4-amino-3-methoxy-pyridine-N-oxide.

(e) 4-Amino-quinoline-N-oxide.

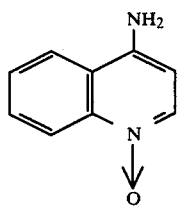

10 g of 4-Nitroquinoline-N-oxide are dissolved in 500 ml of ethanol and hydrogenated at 20°–25° C. with hydrogen under a pressure of 2 bar using 1 g of palladium charcoal (10%). When the calculated quantity of hydrogen has been taken up, the catalyst is removed by suction filtration and the mother liquor is concentrated by evaporation. 7.2 g (85% of theoretical) are obtained after drying on clay: m.p. 270° C.

(f) 2-Hydroxyquinoline-4-carboxylic acid

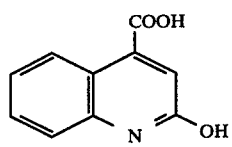

75 g of N-acetyl-isatine are introduced in small portions at boiling point into 37.5 g of sodium hydroxide dissolved in 1500 ml of water and the reaction mixture is boiled under reflux for one hour. It is then cooled and acidified with dilute hydrochloric acid (pH 2–3). The precipitate is separated by suction filtration and washed with a small quantity of water. The moist filtrate is stirred up twice with 1000 ml portions of acetone, suction filtered, washed three times with 150 ml portions of acetone until the washings are colourless, and dried.

Yield: 45.7 g (60.9% of theoretical).

(g) 2-Chloroquinoline-4-carboxylic acid amide

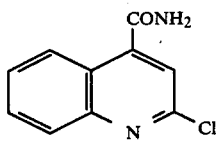

100 g of 2-hydroxyquinoline-2-carboxylic acid (f) are boiled under reflux in 750 ml of freshly distilled thionyl chloride and 40 ml of dimethylformamide until the carboxylic acid has dissolved. The reaction mixture is concentrated by evaporation and the residue is dissolved in 1000 ml of toluene. 2000 ml of a 25% ammonia solution are introduced portionwise into this toluene mixture. The acid amide which precipitates is suction filtered and thoroughly washed with water. The dried product melts at 265–266° C. h) 2-Ethoxyquinoline-carboxylic acid amide-4

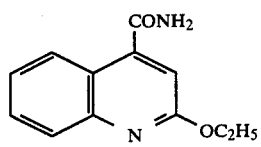

7.5 g of 2-Chloroquinoline-4-carboxylic acid amide (g) are boiled under reflux in 50 ml of sodium ethylate solution (1.15 g of sodium) for 30 minutes and the reaction mixture is then concentrated by evaporation and the residue is stirred up with water, suction filtered and washed with water and the filtrate is recrystallised from ethanol. Yield: 7 g (80% of theoretical).

(i) 2-Ethoxy-4-aminoquinoline

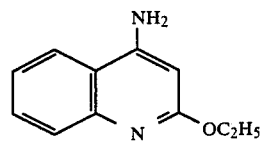

400 ml of Hypobromide solution containing 8 g of bromine and 16 g of potassium hydroxide are poured over 10.8 g of 2-ethoxyquinoline-4-carboxylic acid amide (h) with shaking. The acid amide dissolves within 30 minutes and becomes almost completely colourless. The filtrate is clarified and heated on a water bath for 45 minutes, during which the yellow colour of the solution disappears. The solution is then cooled and the precipitate is suction filtered and washed with water. 7.5 g (80% of theoretical) are obtained after drying in air.

(j) 4-Diacetamine-2-ethoxyquinoline

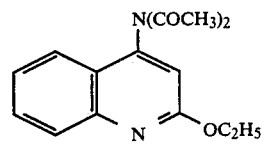

23 g of 4-amino-2-ethoxyquinoline (i) are boiled under reflux in 230 ml of acetic anhydride and 1 ml of sulphuric acid for one hour. The reaction mixture is concentrated by evaporation and the residue is crystallised from ethanol. A snow white product melting at 112–114° C. is obtained.

(k) 4-Diacetamino-2-ethoxyquinoline-N-oxide

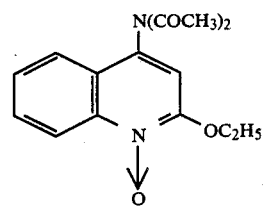

10 g of 4-Diacetamino-2-ethoxyquinoline (j) in 200 ml of glacial acetic acid and 25 ml of hydrogen peroxide are stirred together on a water bath at about 75–85° C. for 20 hours. The reaction mixture is then concentrated by evaporation under vacuum at a temperature of no more than 40° C. and 50 ml portions of water are added three times. The residue, amounting to 12 g, is used for reactions without further purification.

(1) 4-Amino-2-ethoxyquinoline-N-oxide (Amine 3)

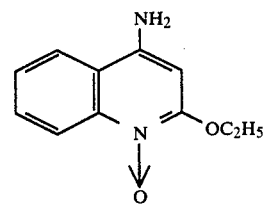

12 g of the residue of 4-diacetamino-2- ethoxyquinoline-N-oxide (k) are boiled under reflux in 300 ml of ethanol for one hour with the addition of 10 g of potassium hydroxide. The reaction mixture is then filtered and the filtrate is acidified with hydrochloric acid. It is then again filtered and the mother liquor is concentrated by evaporation. The residue is stirred up with acetone. 3 g of 4-amino-2-ethoxyquinoline-N-oxide (Amine 9) are obtained after suction filtration.

(m) Dye releasing compound 4

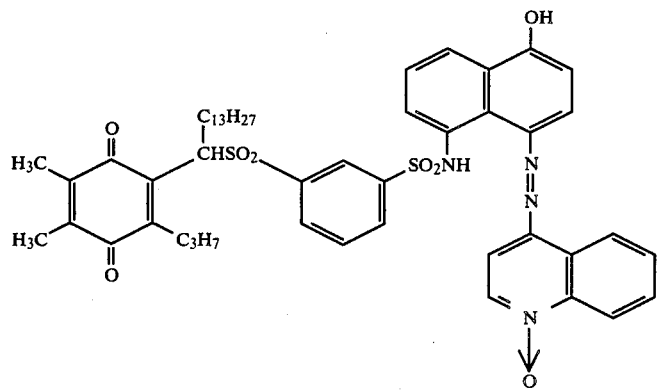

A solution of 4.8 g of 4-aminoquinoline-N-oxide (Amine 6) in 40 ml of trifluoroacetic acid is diazotised at 0° C. with 4.8 ml of 40% nitrosyl sulphuric acid. After one hour. the diazonium salt solution is added dropwise at 0° C. to a solution of 22.2 g of 2,3-dimethyl-5-propyl-6-α-3-(N-5-hydroxy-1-naphthylsulphamoyl)-phenylsulphonyl]-tetradecyl-1,4-quinone (the method of preparation is described in DE-A- No. 3 344 295) in 200 ml of methyl glycol and stirring is then continued for 5 hours at 0° C. The reaction mixture is then stirred into 1000 ml of water and decanted and the smeary residue is again stirred up with 1000 ml of water. After one hour, the reaction mixture is suction filtered and washed with water. 21 g of crude dye are obtained. The dye is chromatographed on a Jobin Yvon Chromatospac Prep. 100 medium pressure-liquid chromatograph C, Instruments SA GmbH, Unterhaching, using an 80 mm×1000 mm column packed with 1.5 kg of silica gel Woelm (ICN) 32-63 nm. Detection is carried out with a preparative LC-UV Detector GOW-MAC 80-800 at a wavelength of 310 nm. A Gilson M 201 is used as fraction collector. A mixture of methylene chloride and ethyl acetate 10/1 is used for elution and working up the fractions yields 2.8 g of an isomeric reddish violet dye and 8.3 g of the desired dye in the form of a dark powder.

The dye releasing compounds according to the present invention are converted by development into diffusible dyes which give rise to a cyan colour image with excellent lightfastness and stability to heat and moisture in the image receptor layer and are also less sensitive to reducing agents.

Colour photographic recording materials used for the production of multicolour images normally contain colour providing compounds, in the present case particularly dye releasing compounds, in spatial and spectral association with the silver halide emulsion layers of differing spectral sensitivities, these compounds serving to produce the different partial colour images in cyan, magenta and yellow.

By spatial association is meant that the dye releasing compound is in such a spatial relationship to the silver halide emulsion layer that the two are capable of interacting so that an imagewise correlation can be obtained between the silver image produced on development and the colour image produced from the dye releasing compound. This spatial relationship is generally obtained by accommodating the dye releasing compound in the silver halide emulsion layer or in an adjacent layer of binder which need not necessarily be light-sensitive.

By spectral association is meant that the spectral sensitivity of each of the light-sensitive silver halide emulsion layers and the colour of the partial colour image produced from the spatially associated dye releasing compound are in a certain relationship to one another, each of the spectral sensitivities (red, green, blue) being associated with a partial colour image of a different colour (generally e.g. the colours cyan, magenta and yellow in this sequence).

Each of the silver halide emulsion layers which are sensitized to different regions of the spectrum may be associated with one or more dye releasing compounds. The dye releasing compound of formula III used according to the invention is preferably associated with a redsensitized silver halide emulsion layer.

If the dye releasing compound is capable of oxidation, it constitutes a reducing agent which is oxidized by the imagewise exposed silver halide either directly or with the aid of electron transfer agents ETA. This results in an imagewise differentiation in the capacity to release the diffusible dye. If, on the other hand, the dye releasing compound is reducible, then it is suitably used in combination with a reducing agent present in a limited quantity, a so-called electron donor compound or electron donor precursor compound which in this case is present in the same layer of binder as the dye releasing compound and the light-sensitive silver halide. The presence of an electron transfer agent may be advantageous even when reducible dye releasing compounds are used in combination with electron donor compounds.

The electron donor compound used in combination with a reducible dye releasing compound serves as reducing agent both for the silver halide and for the dye releasing compound. Since the silver halide and the dye releasing compound compete with each other in the oxidation of the electron donor compound and the silver halide is superior to the dye releasing compound in this reaction, the silver halide present determines those areas of the image within which the dye releasing compound will be converted into its reduced form by the electron donor compound, this action of the silver halide varying according to the imagewise exposure which it has previously received.

Under the conditions of development, the electron donor compound which is present in limited quantity is oxidized by the light-sensitive silver halide under the catalytic activity of the latent image nuclei produced by exposure of the silver halide, this oxidation depending on the extent of exposure which has previously taken place. The oxidized electron donor compound is then no longer available for a reaction with the dye releasing compound so that an imagewise distribution of unused electron donor compound is obtained.

Compounds previously described as electron donor compounds include, for example, non-diffusible or only slightly diffusible derivatives of hydroquinone, of benzisoxazolone, of p-aminophenol or of ascorbic acid (e.g. ascorbyl palmitate) (DE-A-No. 2 809 716).

Other examples of electron donor compounds are known from DE-A-No. 2,947 425, DE-A-No. 3 006 268, DE-A-No. 3 130 842, DE-A-No. 3 144 037, DE-A-No. 3 217 877 and EP-A-No. 0 124 915 and Research Disclosure 24 305 (July 1984). Electron donor compounds of the kind which are formed in situ in the layer from electron donor precursor compounds under the conditions of development are particularly suitable, i.e. electron donor compounds which before development are present in the photographic material in a masked form in which they are virtually inactive. These initially inactive electron donor compounds are then converted into their active form under the conditions of development, for example by the hydrolytic removal of certain protective groups. In the present complex, the term "electron donor compound" also includes these electron donor precursor compounds.

Although a wide variety of methods is available for the incorporation of the dye releasing compounds according to the invention, it has been found advantageous to incorporate dye releasing compounds according to the present invention into the layers in the form of emulsions with the aid of so-called oil formers. This has the advantage, especially when reducible dye releasing compounds which are split up by reduction are used in combination with ED compounds, that the dye releasing compounds and the ED compounds can be brought into very close functional contact in the form of a common emulsion. Suitable oil formers have been described, for example. in U.S. Pat. No. 2 322 027, DE-A-No. 1 772 192, DE-A-No. 2 042 659 and DE-A-No. 2 049 689. The optimum quantities of dye releasing compound and optionally of ED compound to be incorporated may be determined by simple routine tests. The dye releasing compound of the present invention may be used, for example, in quantities of 0.05 to 0.2 mol and the ED compound, if at all, in quantities of 0.1 to 0.6 mol per mol of silver halide.

The light-sensitive silver halide emulsions may be emulsions of silver chloride, silver bromide or mixtures thereof, optionally with a small silver iodide content of up to 10 mol-%, in one of the conventionally used hydrophilic binders. The emulsions may contain organic or inorganic silver salts in addition to the lightsensitive silver halide, especially if the emulsions are used in colour photographic recording materials which are developable by heat. These additional silver salts are on the whole insensitive to light or very much less sensitive than the silver halide. Suitable organic silver salts are, for example, salts of carboxylic acids, such as The binder used for the photographic layes is preferably gelatine although this may be partly or completely replaced by other natural or synthetic binders.

The emulsions may be chemically and/or spectrally sensitized in the usual manner and they may be stabilized by suitable additives. Suitable chemical sensitizers. spectral sensitizing dyes and stabilizers are described, for example, in Research Disclosure 17643; see in particular Chapters III, IV and VI.

The protective colloids and binders used for the layers of the recording material may be conventional hydrophilic film-forming agents of natural or synthetic origin, e.g. proteins, in particular gelatine. Casting auxiliaries and plasticizers may also be used. See Research Disclosure 17643, Chapters IX, XI and XII.

The layers of binder may be hardened in the usual manner, using hardening compounds which react with the reactive groups of the binder, such as amino groups, carbonyl groups or active methylene groups to bring about cross-linking of the binder. Examples of such hardeners include formaldehyde, dialdehydes, α-diketones, compounds containing active halogen atoms, compounds containing oxirane or aziridine groups, compounds containing active vinyl groups such as acryloyl groups or vinyl sulphone groups, and so-called carboxyl group-activating hardeners such as isoxazolium salts, formadinium salts, carbodiimide compounds, carbamoyl pyridinium salts and carbamoyl oxypyridinium salts. See Research Disclosure 17643, Chapter X. The hardeners may be used singly or as mixtures.

Development of the imagewise exposed colour photographic recording material according to the invention may be initiated by a treatment with an aqueous-alkaline developer solution which may be highly viscous. The auxiliary developer compounds required for development are either contained in the developer solution or partly or completely contained in one or more layers of the colour photographic recording material. Development results in the imagewise release of diffusible dyes from the dye releasing compounds and these dyes may be transferred to an image receptor layer which may either form an integral part of the colour photographic recording material according to the invention or it may be in contact with this colour photographic material, at least during the time of development. The image receptor layer may therefore be arranged on the same layer support as the light-sensitive element or on a separate layer support. It consists substantially of a binder containing mordant for fixing the diffusile dyes released from the non-diffusible dye releasing compounds. The mordants used for anionic dyes are preferably long chained quaternary ammonium or phosphonium compounds, e.g. of the kind described in U.S. Pat. Nos. 3 271 147 or 3 271 148. Certain metal salts and their hydroxides which form sparingly soluble compounds with the said dyes may also be used. Polymeric mordants may also be suitable, such as those described in DE-A-No. 2 315 304, DE-A-No. 2 631 521 or DE-A-No. 2 941 818. The dye mordants are dispersed in one of the usual hydrophilic binders in the mordant layer, e.g. in gelatine, polyvinyl pyrrolidone or partly or completely hydrolysed cellulose esters. Some binders may, of course, also function as mordants, e.g. polymers of nitrogen-containing, optionally quaternary bases such as N-methyl-4-vinylpyridine, 4-vinylpyridine or 1-vinylimidazole, as described, for example, in U.S. Pat. No. 2 484 430. Other examples of suitable mordanting binders include the guanyl hydrazone derivatives of alkyl vinyl ketone polymers as described, for example, in U.S. Pat. No. 2 882 156 and guanyl hydrazone derivatives of acyl styrene polymers as described, for example, in DE-A-No. 2 009 498. The last mentioned binders would, however, generally be used in combination with other binders, e.g. gelatine.

If the image receptor layer is left in layer to layer contact with the light-sensitive element after development, then the two layers are generally separated by an alkali permeable, light-reflecting layer of binder containing pigment. This layer serves as optical separation between the negative and the positive and as an aesthetically pleasing image background for the transferred colour image. Such a light-reflecting layer may be preformed in known manner in the light-sensitive colour photographic recording material or it may be produced in situ in known manner in the course of development. If the image receptor layer is arranged between a layer support and a light-sensitive element and is separated from the latter by a preformed light-reflecting layer, then the layer support must either be transparent so that the colour transfer image produced can be viewed through this layer or the light-sensitive element must be removed from the image receptor layer together with the light-reflecting layer to expose the image receptor layer. On the other hand, the image receptor layer may be arranged as the uppermost layer in an integral colour photographic recording material, in which case exposure may suitably be carried out through the transparent layer support.

After the photographic material has been processed, the image receptor layer contains an imagewise distribution of cyan monoazo dyes corresponding to formula I. The dye releasing compound of formula III associated with the originally light-sensitive silver halide emulsion layer is also present in imagewise distribution after processing as a complement of the transferred image dye and may also be used as colour image in known manner (retained image).

In another embodiment of the present invention, the colour photographic recording material may be a heat developable material. In that case, development is initiated by a heat treatment and there is generally no treatment with aqueous baths. In this embodiment of the invention, therefore, the reagents required for development are present in one or more layers of the recording material. This applies particularly to developing agents, bases or precursors of bases and so-called thermal solvents or melt formers: see Research Disclosure 17029 (June, 1978).

EXAMPLE 1

A light-sensitive element of a photographic recording material was prepared by applying the following layers one after another to a transparent support of polyethylene terephthalate. The quantities given refer in each case to 1 m².

Material 1 (not according to the invention)

1. Blue-sensitized layer containing a silver iodochlorobromide emulsion (silver application 0.5 g Ag), 1.4 g of gelatine, 0.3 g of dye releasing compound Y-1 (yellow) and 0.25 g of ED compound ED-1.

2. Intermediate layer of 0.8 g of Colanyl Yellow HR dispersion (Hoechst), 0.1 g of the ED compound ED-1 and 0.8 g of gelatine.

3. Green-sensitized layer containing 0.36 g of a silver chloroiodobromide emulsion (silver application 0.36 g Ag), 0.92 g of gelatine, 0.18 g of dye releasing compound M-1 (magenta) and 0.14 g of the ED compound ED-1.

4. Intermediate layer of 0.6 g of developer compound D, 0.1 g of the ED compound ED-1 and 1.36 g of gelatine.

5. Red-sensitized layer containing a silver chloroiodobromide emulsion (silver application 0.33 g Ag), 1.0 g of gelatine, 0.23 g of dye releasing compound C-1 (cyan) and 0.11 g of the ED compound ED-1.

6. Intermediate layer of 0.05 g of developer compound D and 0.39 g of gelatine.

7. White pigment layer of 16.0 g of $TiO_2$ and 2.3 g of gelatine.

8. Intermediate layer of 0.2 g of diisooctylhydroquinone and 4.0 g of gelatine.

9. Mordant layer containing 4.5 g of a polyvinylimidazole quaternized with chloroethanol to an extent of 20 mol-%, and 5.2 g of gelatine.

10. Hardening layer containing 1.2 g of hardener H and 0.6 g of gelatine.

Materials according to the invention were prepared similarly. These materials differed from Material 1 in that the red-sensitized layer (Layer 5) contained one of the dye releasing compounds of the present invention indicated below instead of dye releasing compound C-1 which is not according to the invention:

| Material 2 | 0.26 g of Dye releasing compound 1 |
| Material 3 | 0.28 g of Dye releasing compound 2 |
| Material 4 | 0.27 g of Dye releasing compound 3 |
| Material 5 | 0.22 g of Dye releasing compound 4 |
| Material 6 | 0.28 g of Dye releasing compound 5 |
| Material 7 | 0.22 g of Dye releasing compound 6. |

The following activator was used for development:

| Potassium hydroxide | 40 g |
| Potassium bromide | 3 g |
| 2,2-Methylpropyl-1,3-propanediol | 25 g |
| 1,4-Cyclohexanedimethanol (50%) | 20 g |
| Water | 912 g. |

The materials were exposed behind a grey wedge and then developed in the given activator for 2 minutes, washed for 5 minutes and dried. Measurements were carried out on the processed materials behind a red filter to determine the $D_{min}$ and $D_{max}$ values as well as the lightfastness (Xeno test apparatus - $7.2 \cdot 10^6$ Lux hours) and dark fading (100 h storage at 35° C. and 90% relative humidity) (Table 1).

TABLE 1

| | | | Lightfastness | | Dark fading |
| | | | $\frac{\Delta D}{D_o}$ $15 \cdot 10^6$ lx · h | | $\frac{D}{D_o}$ |
| Material | $D_{max}$ | $D_{min}$ | at $D = 0.6$ | at $D = 1.2$ | (100 h, 35° C., 90% relative humidity) |
|---|---|---|---|---|---|
| 1 | 2.00 | 0.15 | −60% | −46% | −21% |
| 2 | 2.36 | 0.17 | −27% | −22% | −1.3% |
| 3 | 2.31 | 0.17 | −26% | −30% | −1.7% |
| 4 | 2.62 | 0.19 | −29% | −30% | −0.8% |
| 5 | 2.31 | 0.16 | −28% | −22% | −1.8% |
| 6 | 1.97 | 0.21 | −49% | −45% | −7.8% |
| 7 | 2.27 | 0.16 | −31% | −38% | −3.2% |

Table 1 shows that when the dye releasing compounds according to the invention are used, the lightfastness is improved and dark fading in the tropical cupboard is virtually eliminated.

Annexe of Formulae to Example 1:

Dye releasing compound Y-1 (yellow)

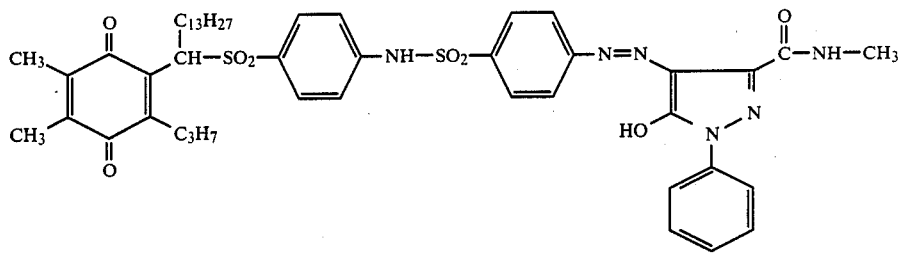

Dye releasing compound M-1 (magenta)

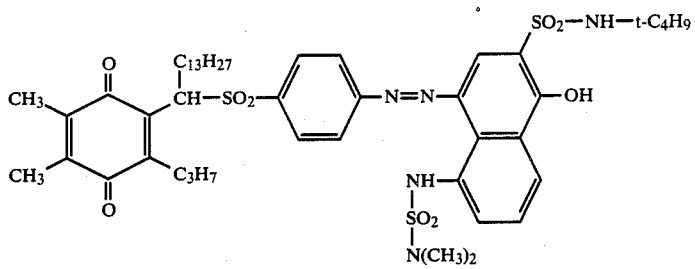

Dye releasing compound C-1 (cyan)

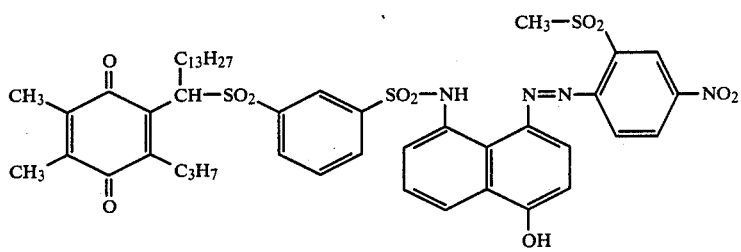

ED Compound ED-1

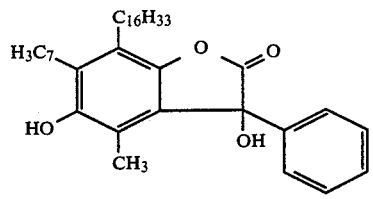

Developer compound D

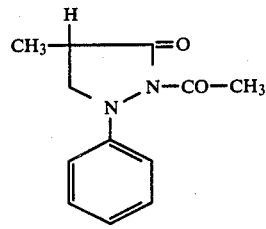

Hardener H

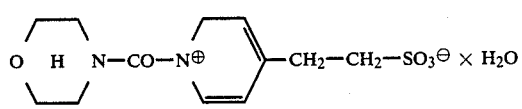

We claim:

1. A colour photographic recording material for the production of colour images by the dye diffusion transfer process, comprising a non-diffusible, colour providing compound (dye releasing compound) associated with at least one light-sensitive silver halide emulsion layer, from which compound a diffusible azo dye is released under the conditions of alkaline development as a function of the development of the silver halide emulsion layer, wherein the azo dye corresponds to the following formula I

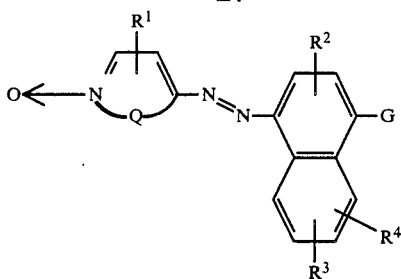

I wherein
- Q denotes a group for completing a pyridine or pyridazine ring on which a carbocyclic or heterocyclic aromatic ring may be condensed;
- G denotes OH or $NH\text{-}SO_2\text{-}R^5$;
- $R^1$ denotes H or one, two or three substituents selected from halogen, alkyl, aryl, carboxyl, alkoxycarbonyl, carbamoyl, cyan, alkoxy, alkylthio, alkylsulphonyl, arylthio and arylsulphonyl;
- $R^2$ denotes H or a group with an electron acceptor character arranged in an ortho-position to G;
- $R^3$ denotes H, acylamine or a group G' having the same definition as G;
- $R^4$ denotes H, $SO_2\text{-}NR^6\text{-}R^7$ or $NH\text{-}SO_2\text{-}R^5$;
- $R^5$ denotes alkyl, aralkyl, aryl or $NR^6\text{-}R^7$;
- $R^6$ denotes H, alkyl, aralkyl or a group which together with $R^7$ and the nitrogen atom forms the residue of a cyclic amino group;
- $R^7$ denotes H, alkyl, aralkyl, aryl or a group which together with $R^6$ and the nitrogen atom forms the residue of a cyclic amino group.

2. Recording material as claimed in claim 1, wherein the azo dye released corresponds to the following formula

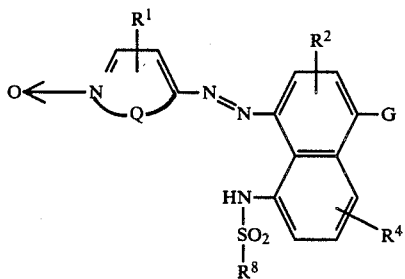

II wherein
- Q denotes a group for completing a pyridine or pyridazine ring on which a carbocyclic or heterocyclic aromatic ring may be condensed;
- $R^1$ denotes H or one, two or three substituents selected from halogen, alkyl, aryl, carboxyl, alkoxycarbonyl, carbamoyl, cyano, alkoxy, alkylthio, alkylsulphonyl, arylthio and arylsulphonyl;
- $R^2$ denotes H, $SO_2\text{-}NR^6\text{-}R^7$, $CO\text{-}NR^6\text{-}R^7$ or Cl;
- $R^4$ denotes H, $SO_2\text{-}NR^6\text{-}R^7$ or $NH\text{-}SO_2\text{-}R^5$;
- $R^6$ denotes H, alkyl, aralkyl or a group which together with $R^7$ and the nitrogen atom forms the residue of a cyclic amino group;
- $R^7$ denotes H, alkyl, aralkyl, aryl or a group which together with $R^6$ and the nitrogen atom forms the residue of a cyclic amino group and
- $R^8$ denotes alkyl, aralkyl, aryl or $NR^6\text{-}R^7$ 3. Recording material as claimed in claim 1, wherein at least one light-sensitive silver halide- emulsion layer has a compound corresponding to the following formula III associated therewith:

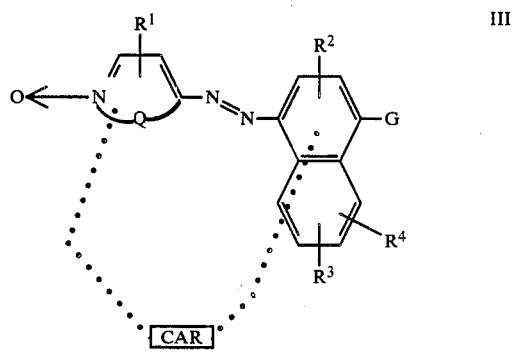

III wherein
- Q denotes a group for completing a pyridine or pyridazine ring on which a carbocyclic or heterocyclic aromatic ring may be condensed;
- G denotes OH or $NH\text{-}SO_2\text{-}R^5$;
- $R^1$ denotes H or one, two or three substituents selected from halogen, alkyl, aryl, carboxyl, alkoxycarbonyl, carbamoyl, cyano, alkoxy, alkylthio, alkylsulphonyl, arylthio and arylsulphonyl;
- $R^2$ denotes H or a group with an electron acceptor character arranged in the ortho-position to G;
- $R^3$ denotes H, acylamino or a group G' having the same definition as G;
- $R^4$ denotes H, $SO_2\text{-}NR^6\text{-}R^7$ or $NH\text{-}SO_2\text{-}R^5$;
- $R^5$ denotes alkyl, aralkyl, aryl or $NR^6\text{-}R^7$;
- $R^6$ denotes H, alkyl, aralkyl, or a group which together with $R^7$ and the nitrogen atom forms the residue of a cyclic amino group;
- $R^7$ denotes H, alkyl, aralkyl, aryl or a group which together with $R^6$ and the nitrogen atom forms the residue of a cyclic amino group; and
- CAR denotes a carrier group containing at least one group which confers diffusion resistance.

* * * * *